US012722594B2

(12) United States Patent
Pelka et al.

(10) Patent No.: US 12,722,594 B2
(45) Date of Patent: Sep. 1, 2026

(54) VEHICLE SEAT WITH BELT SYSTEM

(71) Applicant: GRAMMER Aktiengesellschaft, Ursensollen (DE)

(72) Inventors: Joachim Pelka, Amberg (DE); Michael Klemm, Amberg (DE)

(73) Assignee: GRAMMER Aktiengesellschaft, Ursensollen (DE)

( * ) Notice: Subject to any disclaimer, the term of this patent is extended or adjusted under 35 U.S.C. 154(b) by 220 days.

(21) Appl. No.: 18/642,298

(22) Filed: Apr. 22, 2024

(65) Prior Publication Data

US 2024/0409060 A1 Dec. 12, 2024

(30) Foreign Application Priority Data

Jun. 6, 2023 (DE) ..................... 10 2023 114 893.1

(51) Int. Cl.
*B60R 22/26* (2006.01)
*B60R 22/18* (2006.01)

(52) U.S. Cl.
CPC ...... *B60R 22/26* (2013.01); *B60R 2022/1818* (2013.01)

(58) Field of Classification Search
CPC ............ B60R 22/19; B60R 2022/1818; B60R 2022/1843
See application file for complete search history.

(56) References Cited

U.S. PATENT DOCUMENTS 3,171,688 A * 3/1965 Nicholas ................. B60R 22/34 297/475
4,129,320 A * 12/1978 Fancy ................ A44B 11/2538 24/599.7
4,832,366 A * 5/1989 Corbett ................. B60R 22/024 297/483
5,439,272 A * 8/1995 Hallet .................... B60N 2/688 297/479
5,823,627 A 10/1998 Viano et al.
5,961,147 A * 10/1999 Wier ....................... B60R 22/22 280/801.1

(Continued)

FOREIGN PATENT DOCUMENTS

DE 29609436 9/1996
DE 10055666 A1 * 5/2002 ............ B60R 22/26

(Continued)

OTHER PUBLICATIONS

Extended European Search Report for Europe Patent Application No. 24174912.6, dated Nov. 8, 2024, 20 pages.

(Continued)

*Primary Examiner* — Joseph W Sanderson
(74) *Attorney, Agent, or Firm* — Sheridan Ross P.C.

(57) ABSTRACT

A vehicle seat with a belt system, wherein the belt system has a belt element and a reel and unreel mechanism to reel and unreel the belt element. The belt system has a deflection unit with a deflection element. The deflection element deflects the belt element in the direction of a person. The deflection unit has a spacer element that is arranged on the vehicle seat. The deflection element is arranged on the spacer element in such a way that the deflection element is spaced from the vehicle seat. The spacer element is elastically deformable.

13 Claims, 13 Drawing Sheets

(56) References Cited

U.S. PATENT DOCUMENTS 6,065,777 A * 5/2000 Merrick .................. B60R 22/19 280/808
6,145,881 A 11/2000 Miller, III
6,276,721 B1 * 8/2001 Romeo .................. B60R 22/19 280/483
6,312,015 B1 * 11/2001 Merrick .................. B60R 22/19 280/808
6,601,923 B2 * 8/2003 Pond ........................ B60N 2/24 297/483
6,631,926 B2 * 10/2003 Merrick .................. B60R 22/19 280/808
6,637,825 B2 * 10/2003 Janz ........................ B60R 22/26 280/808
6,726,287 B1 * 4/2004 Janz ........................ B60R 22/26 297/483
7,273,232 B2 * 9/2007 Fontecchio ............. B60R 22/26 297/483
8,303,042 B2 11/2012 Kujawa et al.
8,419,127 B1 4/2013 Wilhelm et al.
8,646,845 B2 * 2/2014 Varcus ................... B60N 2/688 297/483
8,678,438 B2 * 3/2014 You ....................... B60R 21/055 297/482
9,475,453 B2 * 10/2016 Ballarin .............. B60R 22/1954
9,682,682 B2 * 6/2017 Aoki ....................... B60R 22/26
10,012,555 B2 * 7/2018 Sumikawa ................ G01L 5/00
10,086,792 B1 * 10/2018 Watanabe .............. B60N 2/688
10,604,108 B2 * 3/2020 Abramoski ............. B60R 22/26
12,370,975 B2 7/2025 Jaradi et al.
2002/0003347 A1 * 1/2002 Merrick .................. B60R 22/19 280/807
2003/0038525 A1 * 2/2003 Pond ...................... B60N 2/688 297/452.29
2003/0094845 A1 * 5/2003 Janz ........................ B60R 22/26 297/468
2005/0248145 A1 * 11/2005 Fontecchio ........... B60R 22/022 280/808
2008/0067829 A1 * 3/2008 Arias ...................... B60R 22/22 296/65.03
2012/0001466 A1 * 1/2012 Varcus .................... B60R 22/26 242/615.3
2013/0069356 A1 * 3/2013 You ......................... B60R 22/24 280/801.1
2015/0168240 A1 * 6/2015 Sumikawa ............. B21D 22/00 702/42
2015/0266448 A1 * 9/2015 Aoki ...................... B60N 2/688 297/354.1
2015/0367813 A1 * 12/2015 Ballarin .................. B60R 22/18 280/805
2019/0161055 A1 * 5/2019 Abramoski ............ B60N 2/688
2025/0091545 A1 * 3/2025 Jaradi .................... B60N 2/688

FOREIGN PATENT DOCUMENTS

DE 102004019821 A1 * 11/2005 ............. B60R 22/12
DE 102006056532 A1 * 5/2008 ............. B60R 22/03
DE 102007013270 9/2008
DE 202010012472 11/2010
DE 102021207367 A1 * 1/2023 ........... B60R 22/023
EP 1514748 A1 * 3/2005 ............. B60R 22/26
FR 2837158 A1 * 9/2003 ............. B60R 22/26
FR 2916392 A1 * 11/2008 ............... B60N 2/20
FR 2920361 A1 * 3/2009 ............... B60N 2/20
FR 2932134 A1 * 12/2009 ............. B60R 22/18
GB 2401839 A * 11/2004 ............. B60R 22/03
GB 2442714 A * 4/2008 ........... B60N 2/2809
JP S53-026023 3/1978
JP S63-270263 11/1988
JP 2006-298091 11/2006
JP 2014-065056 4/2014
JP 2016-030498 3/2016
KR 19990002246 U * 1/1999 ............. B60R 22/19

OTHER PUBLICATIONS

Official Action (with English translation) for Japan Patent Application No. 2024-062514, dated May 20, 2025, 10 pages.
Official Action (with English translation) for Japan Patent Application No. 2024-062514, dated Oct. 21, 2025, 10 pages.
Official Action (with English translation) for Japan Patent Application No. 2024-062514, dated Mar. 26, 2026, 6 pages.

* cited by examiner 6
7
16
3
5
1
4

VEHICLE SEAT WITH BELT SYSTEM

CROSS REFERENCE TO RELATED APPLICATION

This application claims the benefit of German Patent Application No. 10 2023 114 893.1, filed Jun. 6, 2023, the contents of which are incorporated herein by reference in its entirety.

FIELD

The present invention relates to a vehicle seat with a belt system, wherein the belt system has a belt element and a reel and unreel mechanism, which is provided and designed to reel and unreel the belt element, and wherein the belt system has a deflection unit with a deflection element, wherein the deflection element is provided and designed to deflect the belt element in the direction of a person.

BACKGROUND

Such systems are well known from the state of the art but have the fundamental disadvantage that they are connected relatively close to the vehicle seat or to the vehicle seat, so that deflection or ergonomic belt guidance is not provided for tall and short drivers alike. Furthermore, it is known from the state of the art that the belt deflectors or belt guides are relatively rigid, so that smaller movements of the person sitting on the vehicle seat cannot be followed.

It is therefore the task of the present invention to provide a vehicle seat by means of which good belt guidance and deflection of the belt element is made possible and the comfort for a person sitting on the vehicle seat can be significantly improved.

SUMMARY

The core idea of the present invention is to provide a vehicle seat with a belt system, wherein the belt system has a belt element and a reel and unreel mechanism, which is provided and designed to reel and unreel the belt element, and wherein the belt system has a deflection unit with a deflection element, wherein the deflection element is designed to deflect the belt element in the direction of a person. According to the invention, the present application is characterised in that the deflection unit has an elastically deformable spacer element which is arranged on the vehicle seat and wherein the deflection element is arranged on the spacer element in such a way that the deflection element is spaced from the vehicle seat.

The fact that the deflection element is spaced from the vehicle seat means that the deflection element is at a certain distance from the vehicle seat. The deflection element is therefore connected to the vehicle seat, in particular indirectly, by means of the spacer element.

Alternatively, the term belt element can also be understood as a belt strap. The reel and unreel mechanism can also be understood as a belt retractor or belt reel element.

The formulation that the belt element can be deflected in the direction of a person means in particular that the belt element can be guided and deflected by means of the deflection unit and in particular by means of the deflection element in such a way that the belt element can be deflected or guided by the reel and unreel mechanism in the direction of the person. In particular, the person is a person who has taken a seat on the vehicle seat and is sitting on it.

As already mentioned, the spacer element acts as an intermediate element between the deflection element and the vehicle seat.

The fact that the spacer element is designed to be elastically deformable means that the elastically deformable element can be elastically deformed, particularly when forces, preferably tensile forces, occur. This means that the spacer element is arranged in its zero position in a state in which no forces act on the spacer element. If forces, in particular tensile forces, act on the elastically deformable spacer element, the spacer element can be elastically deformed by the forces or the forces acting on the spacer element, i.e. the spacer element is bent or bent into a deformed state. If the spacer element is in a deformed state and no further forces act on the spacer element, the spacer element moves from the deformed state back to its zero position.

The forces acting on the spacer element refer in particular to the forces that can be transmitted to the belt element by means of or due to the forces acting on the belt element. For example, forces can act on the belt element when the person sitting on the vehicle seat moves, during acceleration manoeuvres, in accidents and the like. Because the person wants to move relative to the vehicle seat in these cases, the movement of the person is transferred to the belt element and correspondingly to the spacer element.

It is therefore particularly preferable according to the present invention that even smaller movements of the person on the vehicle seat can be followed well by the deformable spacer element, so that the person can be provided with improved comfort with regard to smaller movements on the vehicle seat.

In the state of the art, such followings of the spacer element are not provided, so that when forces occur on the belt element, the reel and unreel mechanism is blocked and, accordingly, the movement of the person on the vehicle seat is also blocked.

This disadvantage is remedied by the present invention, in particular the elastically deformable spacer element, and improved and more comfortable belt guidance is ensured.

According to a particularly preferred embodiment, it is provided that the elastically deformable spacer element is designed in such a way that when the spacer element is deformed up to a predetermined critical angle, the deformation of the spacer element is elastic and from the critical angle onwards the deformation of the spacer element is plastic.

When the critical angle is reached, a load on the spacer element changes from a bending load to a tensile load, switching from an elastic deformation to a plastic deformation.

The fact that the spacer element is or can be plastically deformed from a certain critical angle means that the spacer element is plastically deformed when particularly high or critical forces occur, which means that forces can be absorbed in order to absorb loads on the person sitting on the vehicle seat. For smaller forces, it is intended that the spacer element can be elastically deformed up to the critical angle. The plastic deformation or deformation therefore has a safety aspect, particularly in the event of accidents, crashes or the like.

It is particularly preferable for the predetermined critical angle to be 45°.

In particular, the vehicle seat according to the invention, also in particular in conjunction with the predetermined critical angle, can fulfil the requirements or demands of SAE J2292 and also pass the tensile test defined therein well.

According to a particularly preferred embodiment, the spacer element can be represented particularly simply if the elastically deformable spacer element has a layered structure. Particularly preferably, therefore, the spacer element has a layer structure, and preferably the layer structure comprises at least two layers. It may preferably be provided that the layers of the layer structure are of the same type. In the case of several layers, i.e. more than two layers, it may be provided that individual layers are formed identically to one another and further individual or additional layers are formed differently. This can make it possible to design the spacer element according to the requirements at hand.

According to a further preferred embodiment, it may be provided that the spacer element comprises a locking element which interconnects the different layers of the spacer element and is preferably intended and designed to fail at an angle greater than the predetermined critical angle and therefore to allow the plastic deformation of the spacer element.

Furthermore, according to a preferred embodiment, the elastically deformable spacer element can be designed in such a way that each layer of the layer structure is a leaf spring element. In a particularly preferred embodiment, the layers can be designed differently, as already explained, so that the leaf spring elements can also be different from one another.

According to a further preferred embodiment, it may be provided that the spacer element is elongated. Preferably, the spacer element therefore has an extension direction in which the elongated extension of the spacer element extends. Furthermore, elongated means that, compared to the extension in the direction of extension, the height extension and the width extension are smaller than the extension in the direction of extension.

This makes it possible to arrange the spacer element well on the vehicle seat and adapt it to the challenges or needs of the vehicle seat with the belt system.

Further preferably, according to one embodiment, the spacer element has a first end and a second end. Particularly preferably, the first end is connected to the vehicle seat. Further preferably, it may be provided that the deflection element is arranged at the second end of the spacer element. Preferably, it is provided that the spacer element is fixedly connected to the vehicle seat.

In order to further improve comfort for a person sitting on the vehicle seat, it is particularly preferable for the elastically deformable spacer element to be displaced and/or rotatably arranged relative to the vehicle seat. However, it may be possible for a person to adjust the position of the deflection element with respect to the vehicle seat so that the deflection element is arranged in the correct position for the driver. As mentioned, the elastically deformable spacer element can be displaced relative to the vehicle seat. For example, it is possible here to provide a guide by means of one or more tongue and groove elements, with the groove preferably being arranged on the spacer element and the tongue on the vehicle seat. Alternatively or cumulatively, it may be possible for the elastically deformable spacer element to be arranged rotatably relative to the vehicle seat. This can mean that by rotating the spacer element, the spacer element can be aligned accordingly.

Particularly preferably, it can be provided that a displacement or a rotation of the spacer element relative to the vehicle seat constitutes a detachable connection, whereby the connection between the spacer element and the vehicle seat can be detached evenly and the spacer element can also be firmly reconnected to the vehicle seat, in particular after a displacement and/or rotation of the spacer element.

The fixed connection of the spacer element to the vehicle seat can prevent unintentional movement of the spacer element in order to have a correspondingly good positioning of the deflection element in relation to the vehicle seat and to ensure a good application of force or force deflection on the deflection element or the spacer element.

The elastically deformable spacer element can be provided in a particularly advantageous manner if the spacer element consists of one or more metals and/or metal alloys. It may be particularly preferable for the spacer element to consist of or be made of a corrosion-resistant spring steel, in particular a stainless spring steel. By forming the spacer element from metals or metal alloys, a good balance between deformation and stability or rigidity can be provided.

The material of corrosion-resistant spring steel is particularly favoured, as it is precisely this material that can provide the spacer element with the required properties. Stainless steel is also readily available and can still be purchased at a favourable price.

To further increase comfort for a user of the vehicle seat or the person on the vehicle seat, it can be provided according to a particularly preferred embodiment that the deflection element is rotatably connected to the elastically deformable spacer element. This means that the deflection element is rotatably connected to the spacer element, whereby the belt element, which extends through the deflection element or can be deflected by means of the deflection element, can easily follow a deflection of the belt element by stresses to the side, i.e. by the application of force perpendicular to a tensile force.

Furthermore, according to a preferred embodiment, it may be provided that the vehicle seat has a backrest. Further preferably, it is provided that the elastically deformable spacer element is connected to the backrest. Preferably, this connection between the spacer element and the backrest is such that the spacer element is arranged on a rear part of the backrest, on a lateral part of the backrest, and/or on an upper part of the backrest.

This means that the spacer element and, accordingly, the deflection element can be positioned accordingly so that the belt element can be positioned as well as possible with regard to the person sitting on the vehicle seat. The spacer element should be arranged in such a way that it does not interfere with the person when driving or using the vehicle seat. It is particularly preferable for the spacer element to be arranged on the rear part of the backrest. This is particularly advantageous if the reel and unreel mechanism is also arranged on the rear part of the backrest or is arranged behind the backrest. Attachment to a lateral part of the backrest depends on the space available to the left or right in the vehicle or with regard to the vehicle seat. The same naturally applies in a similar way to the upper part of the backrest, whereby it may be preferable for a headrest to be provided. In the event that this headrest is provided, it is particularly preferable for the deflection element to be arranged at the same height as the headrest.

According to a further preferred embodiment, it may be provided that the reel and unreel mechanism is arranged behind the backrest. Further preferably, it may be provided that the reel and unreel mechanism is arranged on a seat part of the vehicle seat and/or on a vehicle seat base. Accordingly, the seat part can be understood as the element of the vehicle seat on which the person can sit. The vehicle seat base can be understood in such a way that it represents a support part on which the vehicle seat itself is arranged.

Due to this arrangement of the reel and unreel mechanism, it is accordingly possible for the reel and unreel mechanism to be moved with the vehicle seat or with the corresponding element when the vehicle seat is moved during a longitudinal adjustment, a width adjustment and/or a height adjustment. This also applies to a rotation of the vehicle seat. This means that the reel and unreel mechanism can move in the same way as the vehicle seat or the vehicle seat base so that this mechanism can be positioned accordingly.

According to a further preferred embodiment, it may be provided that a guide element is arranged between the reel and unreel mechanism and the deflection element for guiding the belt element. This means that the guide element is intended and designed to guide the belt element provided accordingly, i.e. in this case, to guide it towards the deflection element.

According to a further preferred embodiment, it may be provided that the guide element is arranged between the vehicle seat and the elastically deformable spacer element. This makes it possible to efficiently utilise the space between the vehicle seat and the spacer element or between the backrest and the spacer element.

Alternatively, according to a further preferred embodiment, it can be provided that the guide element is arranged on a side of the elastically deformable spacer element facing away from the vehicle seat. As a result, the corresponding guide element can be designed in a particularly advantageous way in order to ensure that the belt element is guided particularly well.

According to an alternative embodiment, it can be provided that the belt element is arranged between the vehicle seat and the elastically deformable spacer element, whereby a guide element can be dispensed with. If the guide element is dispensed with and the belt element is arranged between the spacer element and the vehicle seat, guidance of the belt element is already inherently predetermined.

Further embodiments and configurations in the embodiments are applicable to the other embodiments and can be freely combined with one another, provided that they do not correspond to opposing embodiments.

Further advantageous embodiments are shown in the subclaims.

Further objectives, advantages and usefulness of the present invention can be found in the following description in conjunction with the drawings.

The invention is described in more detail below in connection with the figures.

DETAILED DESCRIPTION

In the figures, identical components are to be understood with the corresponding reference signs. For the sake of clarity, components may not be labelled with a reference sign in some figures, but have been designated elsewhere.

Figures 1A, 1B, 1C:
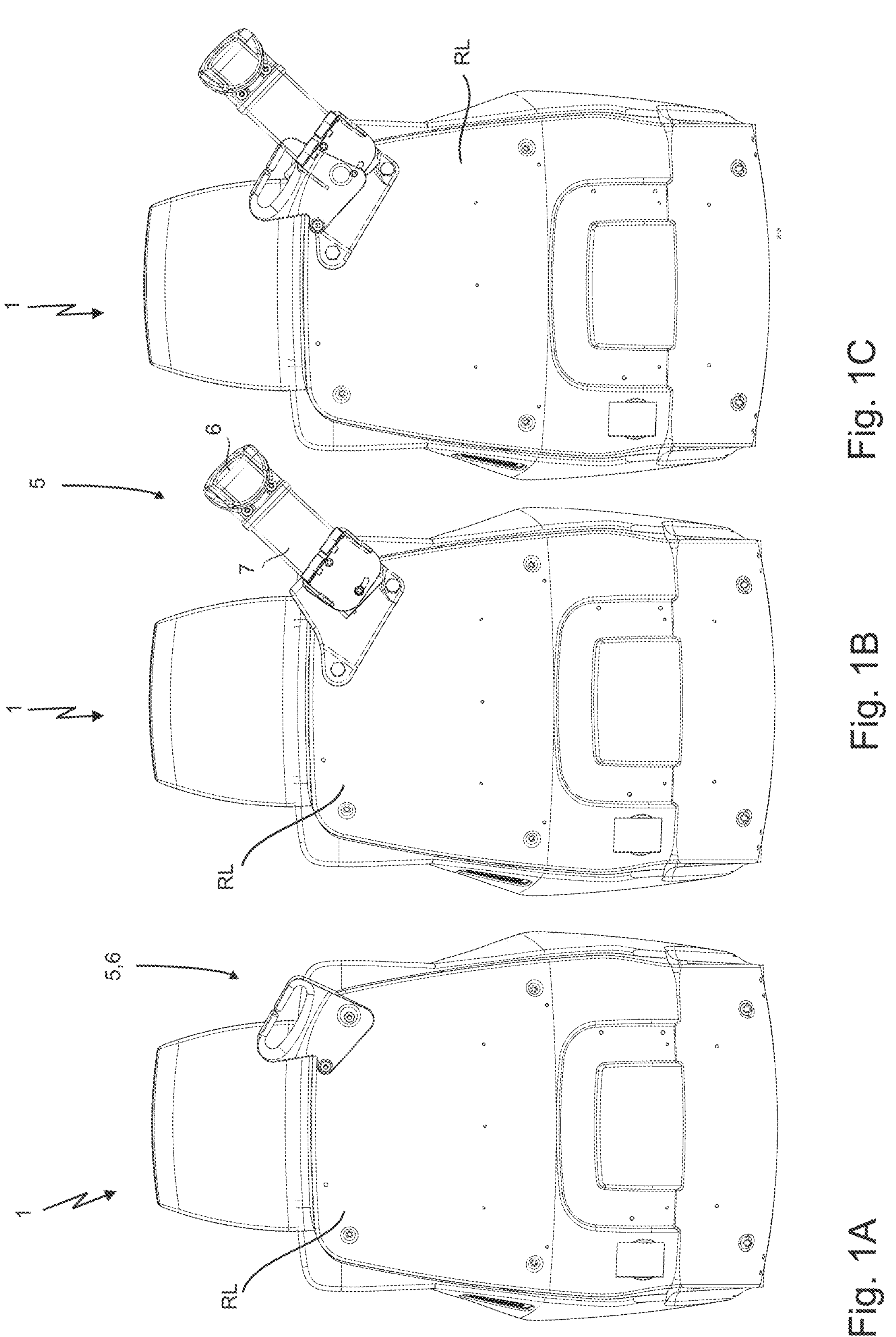
FIG. 1A a vehicle seat of the prior art.
FIG. 1B a vehicle seat according to the invention.
FIG. 1C comparison of the vehicle seats shown in FIGS. 1A and 1B.

FIG. 1A shows a vehicle seat 1 according to the known state of the art, wherein the vehicle seat 1 has a backrest RL on which a deflection unit 5 with a deflection element 6 is shown. For the sake of clarity, a belt system 2 with a belt element 3 and the reel and unreel mechanism 4 have been omitted at this point.

As can be seen in FIG. 1A, the deflection element 6 is arranged relatively close to the backrest RL, so that ergonomic or comfortable guidance and deflection of a belt element 3 cannot be provided.

In contrast, a vehicle seat 1 according to a preferred embodiment of the invention is shown in FIG. 1B, wherein the deflection element 6 of the deflection unit 5 is again arranged on the backrest RL of the vehicle seat 1. The deflection element 6 is connected to the backrest RL by means of a spacer element 7. The spacer element 7 makes it possible to arrange the deflection element 6 at a relatively large distance from the backrest RL, as shown.

A comparison between the vehicle seat 1 according to the prior art and the vehicle seat 1 according to the present invention is shown in FIG. 1C, where it can be clearly seen how the arrangement of the respective deflection element 6 differs from the backrest RL or the vehicle seat 1.

The arrangement of the deflection element 6 further to the outside enables better or more optimised ergonomics of the belt system 2 or guidance of the belt element 3. Particularly preferably, compared to the prior art shown in FIG. 1A, the deflection element 6 can be arranged in total figures more than 100 mm further outwards in a width direction B and more than 50 mm in a height direction H with respect to the vehicle seat 1. Particularly preferably, the deflection element 6 can be arranged further outwards by up to 130 mm in the width direction B and up to 80 mm in the height direction H compared to the prior art.

In the following figures, further embodiments, configurations and features of the present invention are shown in more detail.

Figure 2A:
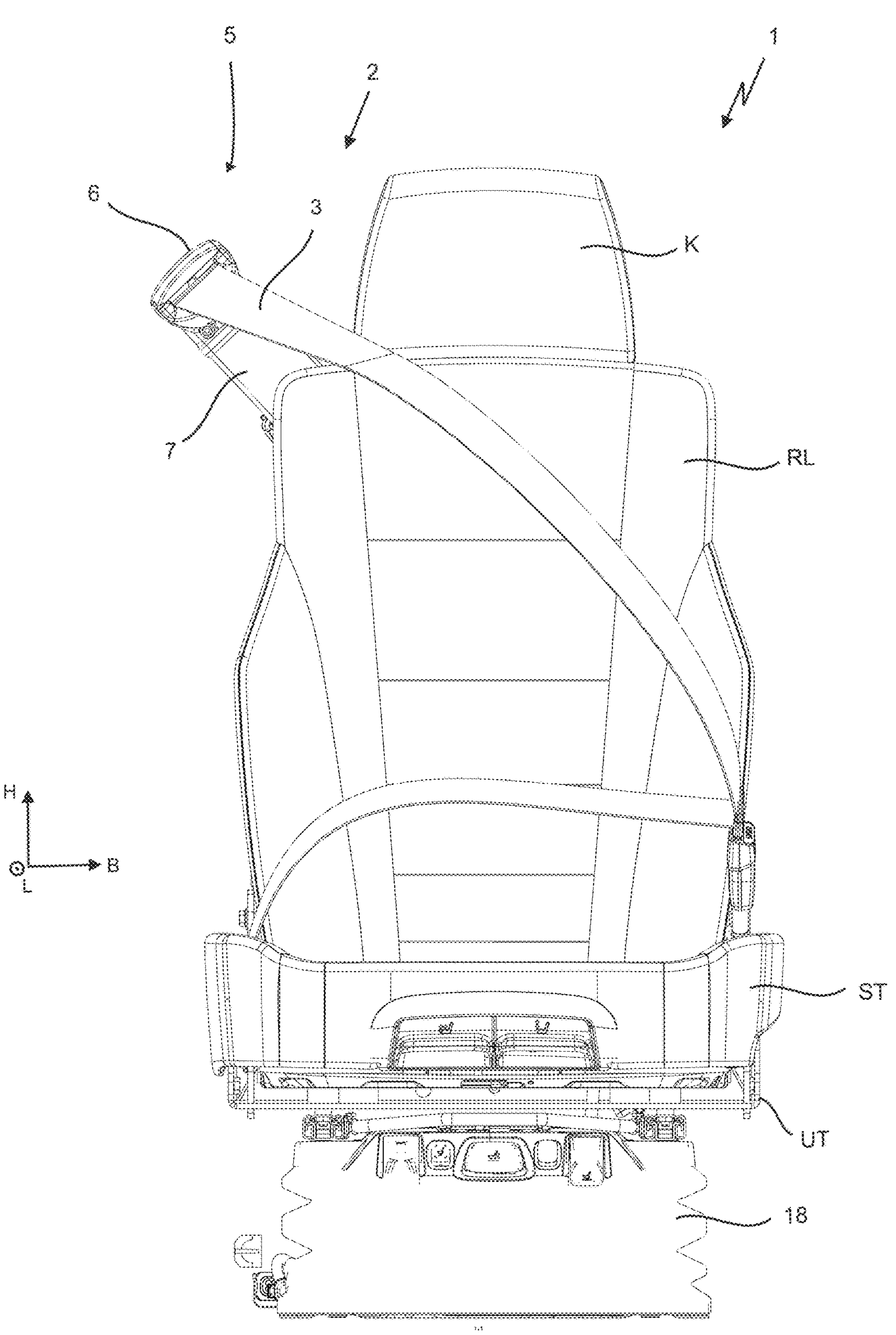
FIG. 2A front view of the vehicle seat according to a preferred embodiment.
Figure 2B:
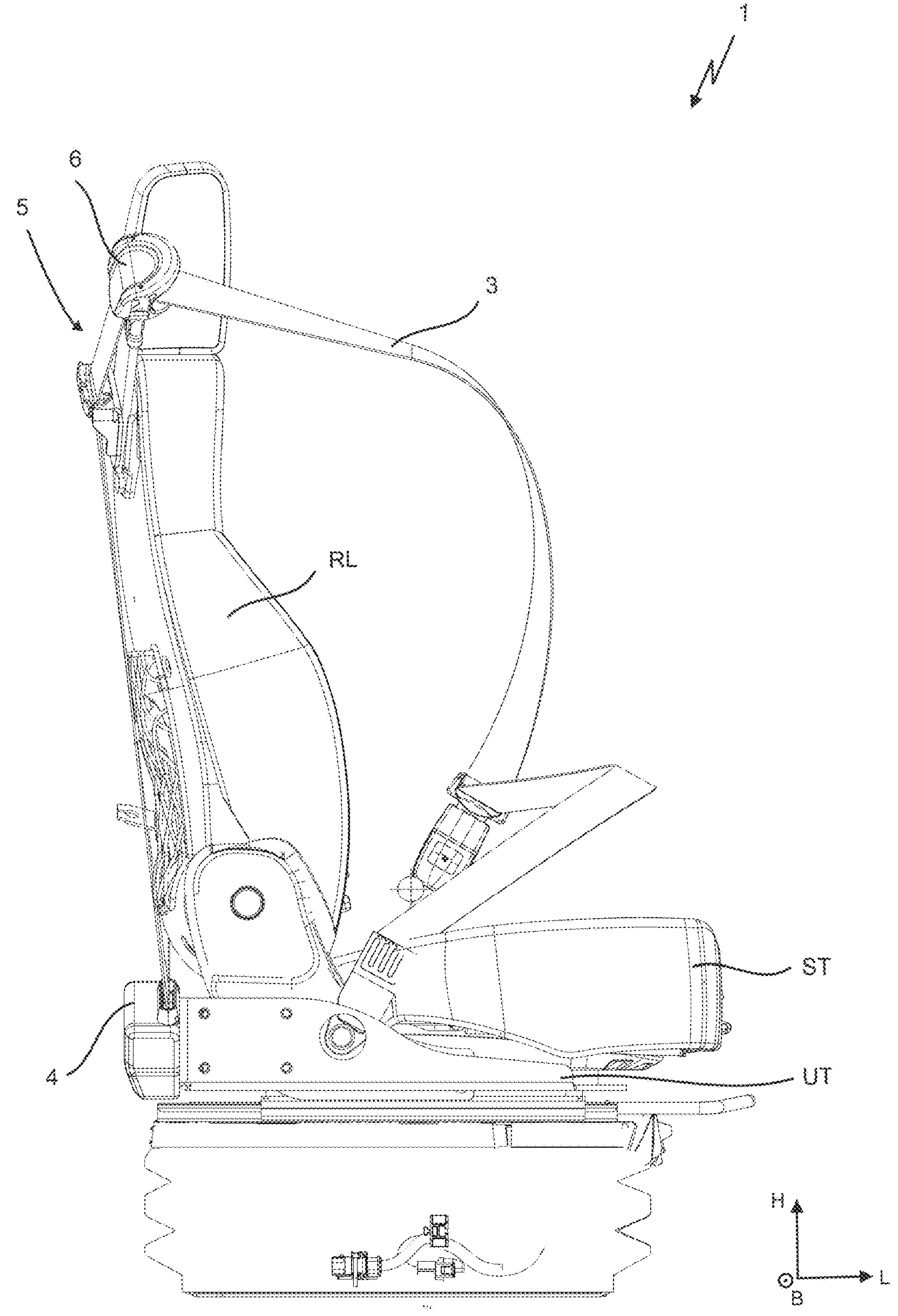
FIG. 2B a side view of the vehicle seat shown in FIG. 2A.
Figure 2C:
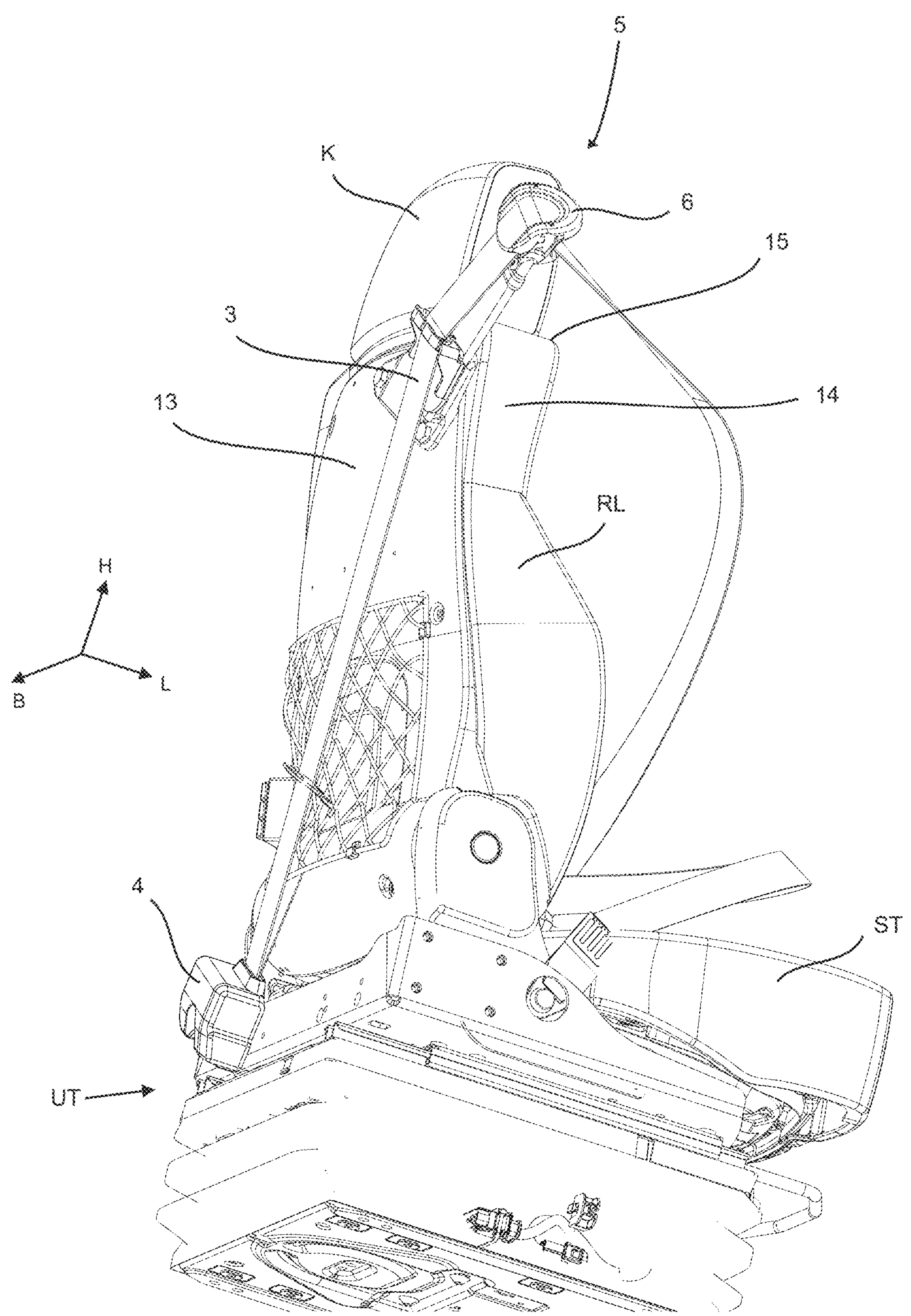
FIG. 2C perspective view from the rear of the vehicle seat shown in FIG. 2A.

In FIG. 2A, a vehicle seat 1 according to a preferred embodiment is shown from the front, in FIG. 2B in a side view and in FIG. 2C in a perspective view from the rear.

As can be seen, the vehicle seat 1 according to a preferred embodiment comprises a backrest RL, a seat part ST and a vehicle seat base UT, wherein the vehicle seat base UT is arranged below the seat part ST, and wherein the seat part ST is connected to the vehicle seat base UT. The vehicle seat base UT further preferably comprises a spring and/or damping unit 18, which is merely characterised by way of example in this example and spring units and damping units per se have been omitted.

Furthermore, the vehicle seat 1 can comprise a headrest K.

Furthermore, the belt system 2 is shown with a belt element 3, whereby the belt system 2 can be a 3-point belt known from the prior art. The deflection element 6 of the deflection unit 5 is connected to the vehicle seat 1, in this case to the backrest RL, by means of the spacer element 7 and is spaced apart from it. The deflection element 6 is intended and designed to deflect the belt element 3 accordingly and guide it towards the person. The person is not shown here, but can be imagined sitting on the seat part ST or the vehicle seat 1. Further details regarding the 3-point belt can be omitted.

In FIG. 2B, the vehicle seat 1 according to FIG. 2A is shown in a side view, whereby the reel and unreel mechanism 4 can now also be recognised, which is connected in the present case to the vehicle seat base UT and is preferably arranged and connected to the vehicle seat 1 behind the vehicle seat 1. In the present case, the reel and unreel mechanism is connected to the vehicle seat base UT, although it is also conceivable that the reel and unreel mechanism 4 can be connected to the seat part ST, the backrest RL or other elements of the vehicle seat 1.

In FIG. 2C, the vehicle seat according to FIGS. 2A and 2B is shown again in a perspective view from the rear.

Particularly preferably, the deflection element 6 and the deflection unit 5 are designed to guide the belt element 3, which can be provided from the reel and unreel mechanism 4, shown in the embodiments shown in FIGS. 2A, 2B and 2C, from the reel and unreel mechanism 4 from a position relatively far below with respect to the vehicle seat 1 and behind the vehicle seat 1 upwards and from the deflection element 6 from above at the rear to above at the front and downwards again.

The various possibilities or embodiments with regard to the guidance of the belt element 3 are shown in more detail in the following figures.

Figures 3A, 3B:
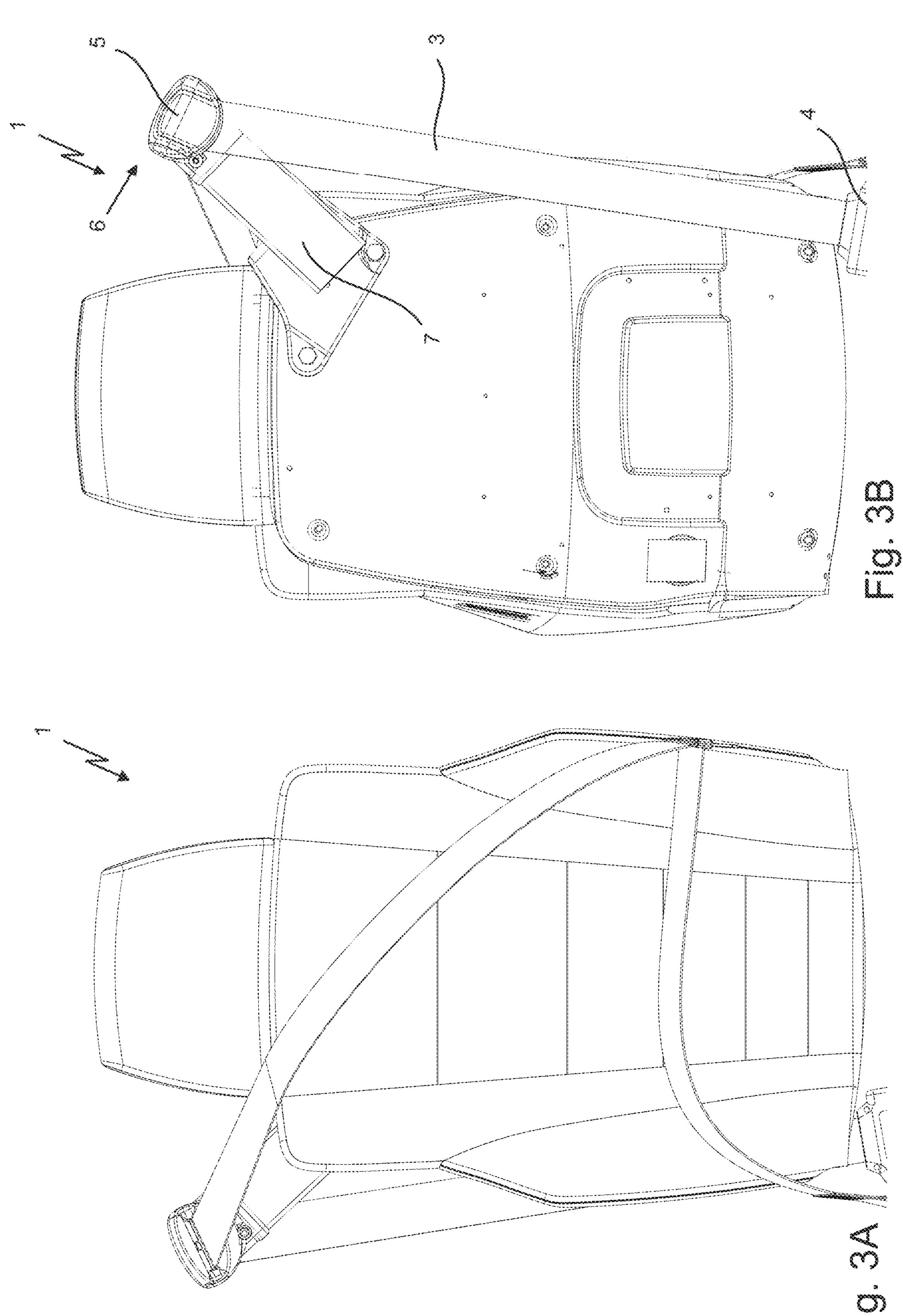
FIG. 3A a front view of a vehicle seat according to one embodiment.
FIG. 3B rear view of the vehicle seat shown in FIG. 3A.

In FIGS. 3A and 3B, the belt guide is designed such that no further guide is arranged between the reel and unreel mechanism 4 and the deflection element 6, i.e. the belt element 3 is only guided behind the backrest RL by the reel and unreel mechanism 4 and the deflection element 6.

It is intended that the belt element 3 is arranged on a side of the spacer element 7 facing away from the vehicle seat 1. This means that, viewed in the longitudinal direction L, the spacer element is arranged behind the vehicle seat 1 and the belt element 3 is arranged behind the spacer element 7.

Figure 4B:
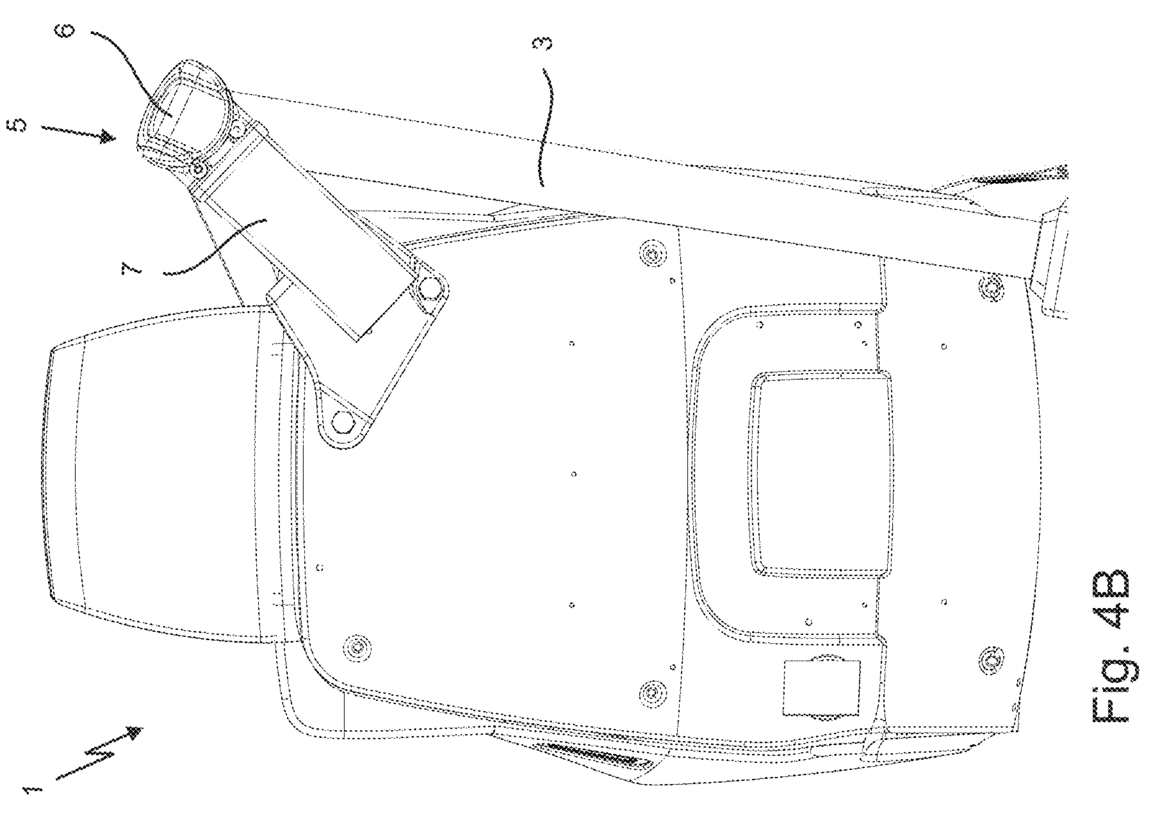
FIG. 4B rear view of the vehicle seat shown in FIG. 4A.
Figure 4A:
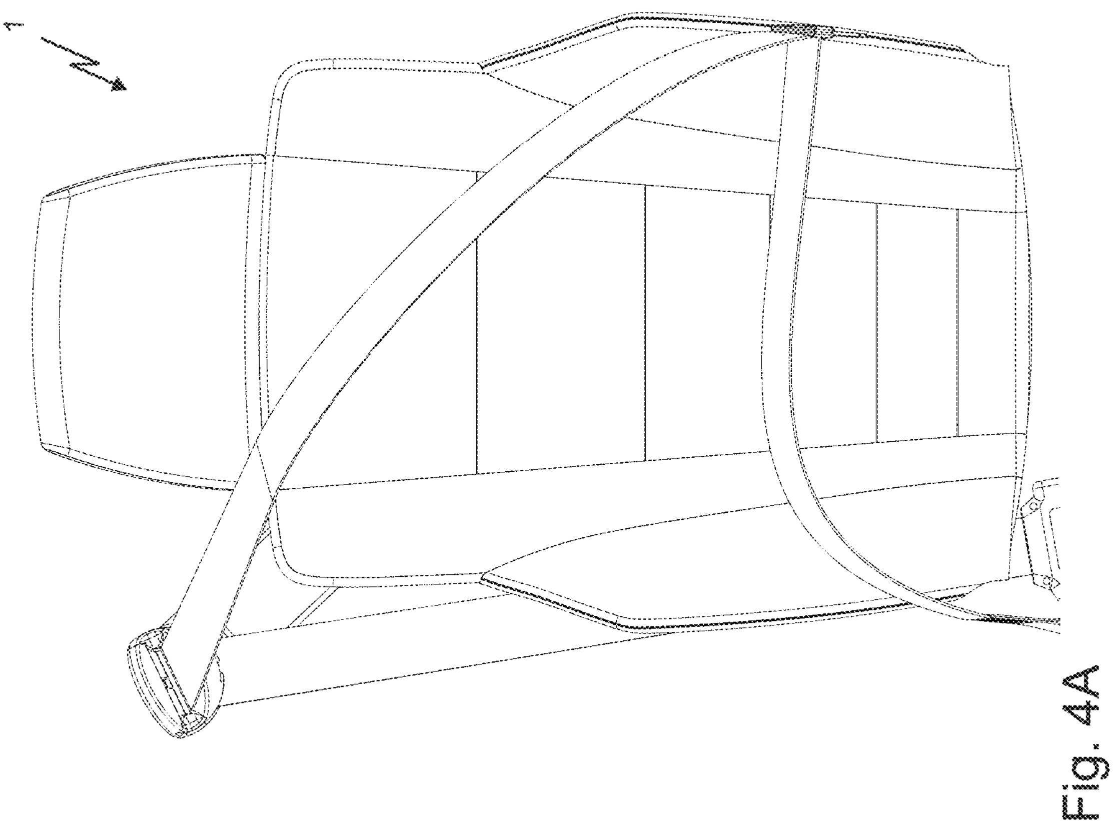
FIG. 4A a front view of a vehicle seat according to one embodiment.

FIGS. 4A and 4B show an alternative embodiment to FIGS. 3A and 3B, in which the belt element 3 is not arranged behind the spacer element 7, but in such a way that the belt element 3 is arranged between the vehicle seat 1 and the spacer element 7. This means that, viewed in the longitudinal direction L, the belt element 3 is arranged behind the vehicle seat 1 and the spacer element 7 is arranged behind the belt element 3.

Figures 5A, 5B:
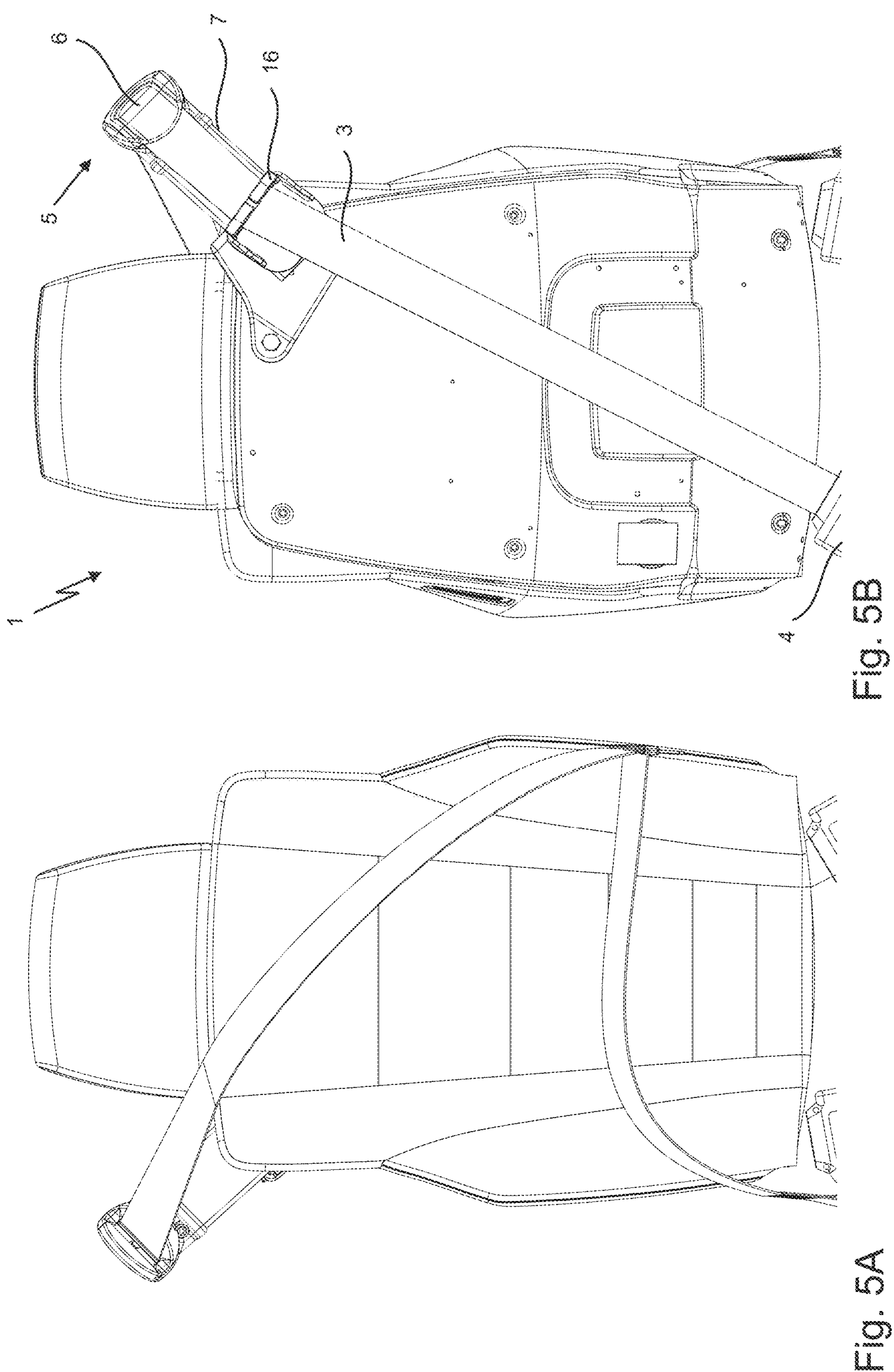
FIG. 5A a front view of a vehicle seat according to one embodiment.
FIG. 5B rear view of the vehicle seat shown in FIG. 5A.

Referring to FIGS. 5A and 5B, a further embodiment of the guide of the belt element 3 is shown, wherein a guide element 16 is provided, which is arranged between the reel and unreel mechanism 4 and the deflection element 6 with respect to the belt element 3 or its guide. According to the present FIG. 5B, it is provided that the guide element 16 is connected to the spacer element 7. In principle, it is also possible for the guide element 16 to be connected to the vehicle seat 1, for example the backrest RL. In this case, the guide element 16 is designed in such a way that it is possible to guide the belt element 3 and, if necessary, to deflect the belt element 3 slightly.

In the present embodiment according to FIG. 5B, it is provided that the guide element 16 is arranged behind the spacer element 7 as seen in the longitudinal direction L and is connected thereto.

It would also be possible in principle for the guide element 16 to be arranged between the vehicle seat 1 or the backrest RL and the spacer element 7; this is particularly advantageous if the belt guide of the belt element 3 is such that the belt element 3 is arranged between the vehicle seat 1 and the spacer element 7.

In the further figures, the mode of operation of the spacer element 7 and the embodiments or designs with regard to the spacer element 7 are now shown in more detail.

According to the invention, it is provided that the spacer element 7 is designed to be elastically deformable, i.e. it is designed as an elastically deformable spacer element 7. It is further preferably provided that, in the event that no force is exerted on the spacer element 7 by a movement of the belt element 3, the spacer element 7 is in a zero position, i.e. is not deformed. However, if tensile forces in particular, which act on the belt element 3, act on the spacer element 7, the spacer element 7 is deformed accordingly and is therefore in a deformed state. Due to the fact that tensile forces in particular act on the spacer element 7, the spacer element 7 is deformed accordingly in the direction of the tensile force, i.e. preferably forwards in the longitudinal direction L.

Figure 6A:
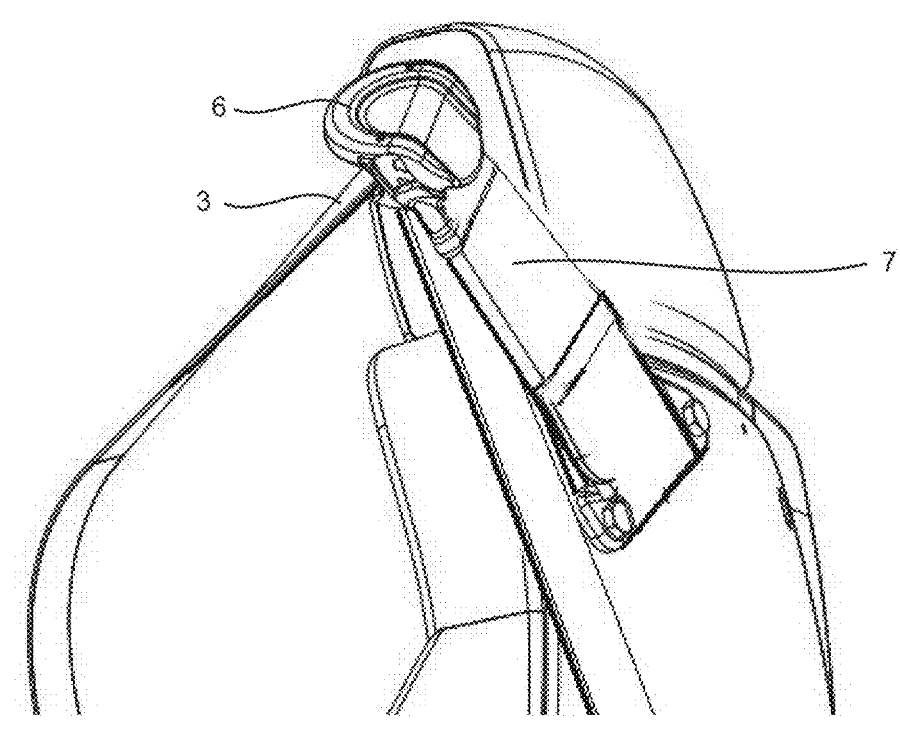
FIG. 6A the spacer element in a zero position.

In FIG. 6A, the spacer element 7 is shown in the zero position. This means that no forces are acting on the spacer element 7, as no forces are acting on the belt element 3.

Figure 6B:
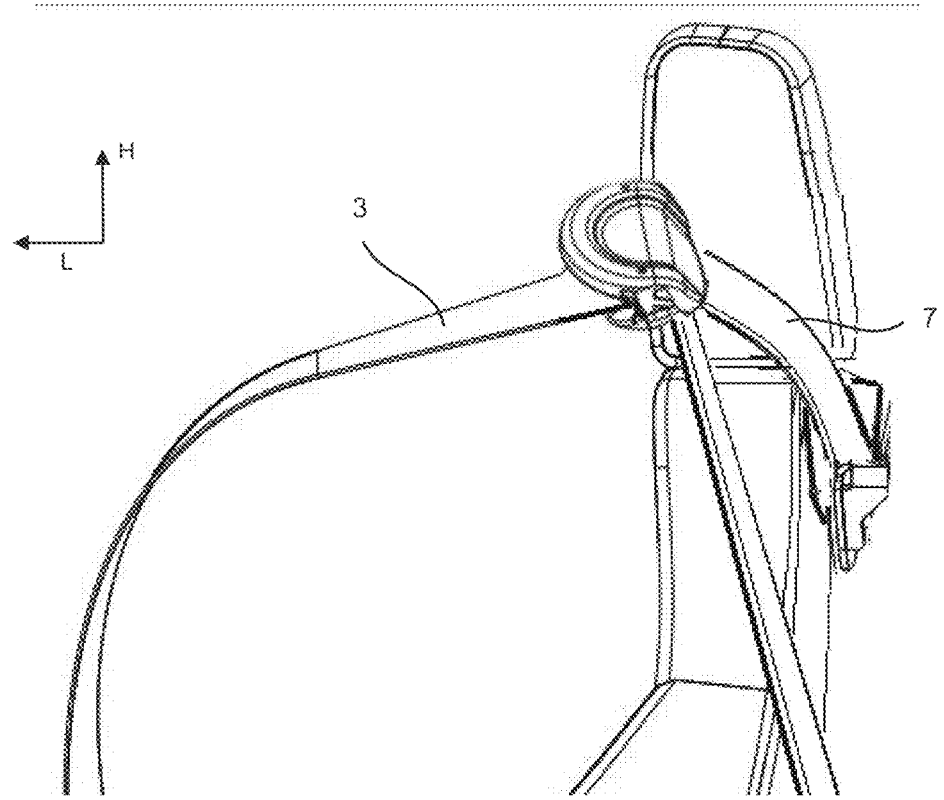
FIG. 6B the spacer element in a deformed position.

In FIG. 6B, on the other hand, the spacer element 7 is shown in a deformed state, whereby the action of forces on the belt element 3 in the longitudinal direction L towards the front can accordingly also transmit the forces to the spacer element 7 via the deflection element 6, which results in the spacer element 7 being deformed towards the front. FIG. 6B also shows the embodiment in which the spacer element 7 is deformed forwards. FIG. 6B also shows the embodiment in which the belt element 3 is arranged in the zero position between the vehicle seat 1 and the spacer element 7, and is accordingly moved forwards by the spacer element 7 with the deflection element 6.

Figure 6C:
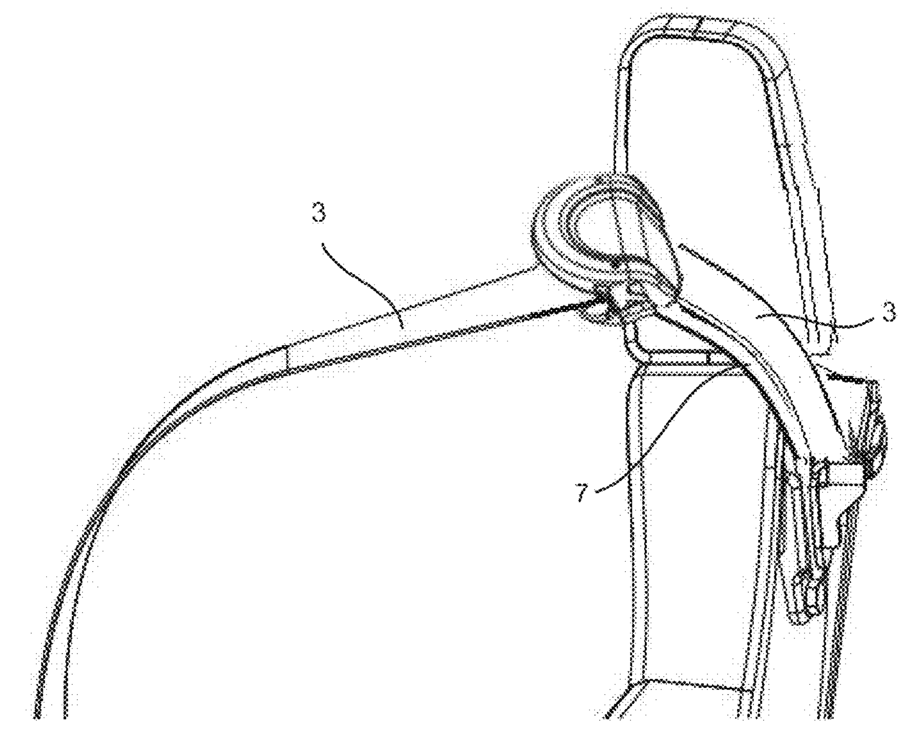
FIG. 6C the spacer element in a deformed position.

In FIG. 6C, the initial situation is as in FIG. 6B, but in this case the belt element 3 is arranged behind the spacer element 7, so that the belt element 3 moves accordingly with the spacer element 7.

Figure 7:
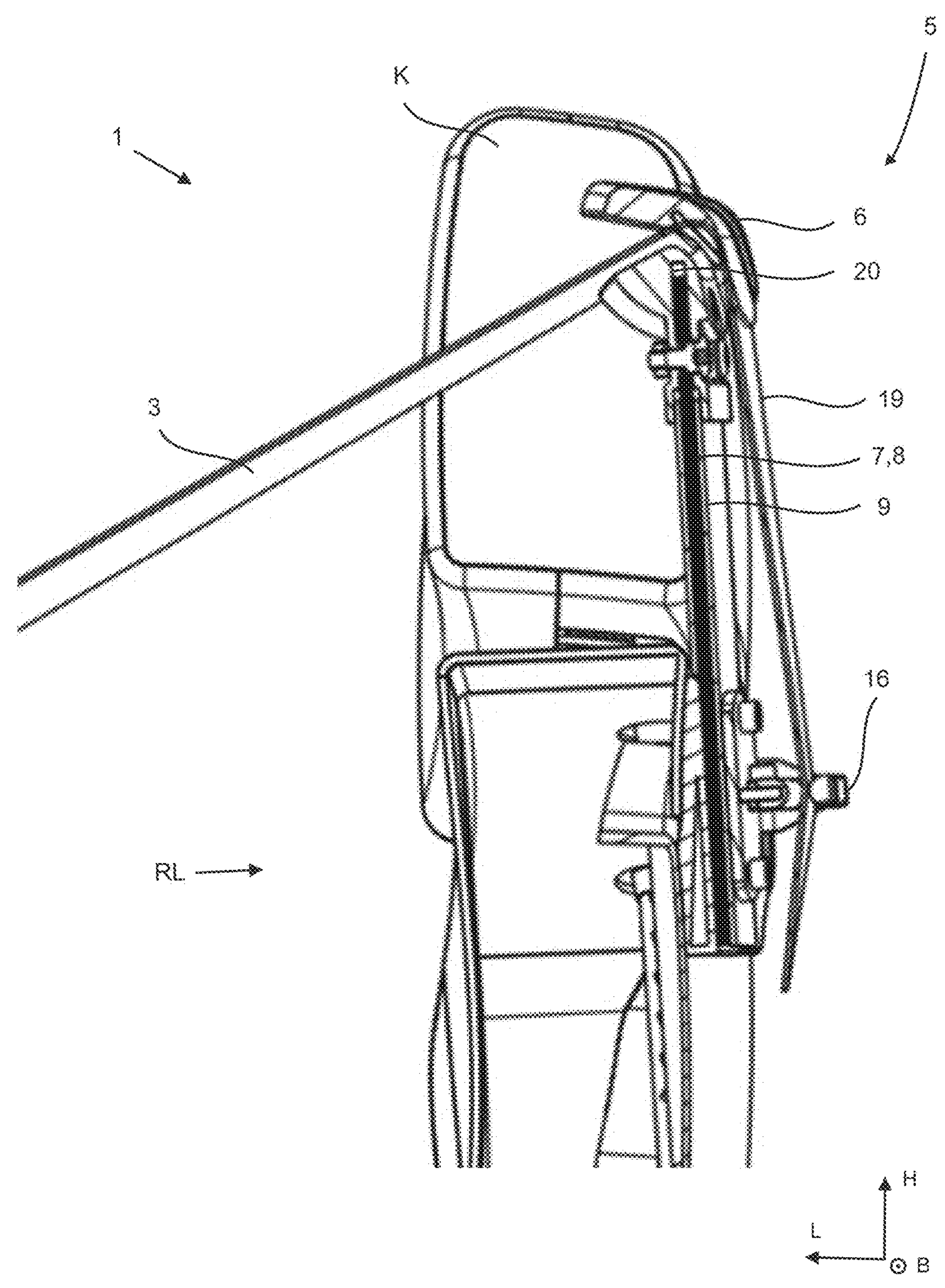
FIG. 7 a sectional view of the deflection unit.

FIG. 7 shows a sectional view of part of the vehicle seat 1, the section being such that the spacer element 7, the deflection element 6 and other features of the deflection unit 5 can be seen in the sectional view.

It is particularly preferred that the deflection element 6 has a slot 20 which is designed and intended to be plugged onto the spacer element 7, so that the spacer element 7 extends partially into the deflection element 6. Further preferably, the slot 20 is designed such that it provides an installation space and a free space for the movement of the spacer element 7 when the spacer element 7 is deformed. It is further provided that a first screw connection 19 is provided, which is also provided for the connection between the deflection element 6 and the spacer element 7. Further details of the first screw connection 19 are provided in the following figures.

It can also be seen that the spacer element 7 has a layer structure 8 with at least several layers 9. The layers 9 are arranged in such a way that they are superimposed on one another. The respective layers 9 are particularly preferably formed from a leaf spring element. This makes it possible to provide a particularly simple construction of the spacer element 7. In particular, the layer structure 8 with the layers 9 is such that the layers 9 can move relative to one another when the spacer element 7 is deformed, i.e. the layers 9 can shift or move relative to one another. This is advantageous in order to be able to follow the deformation or movement of the spacer element 7 due to the action of forces.

Figures 8A, 8B, 8C, 8D, 9A, 9B:
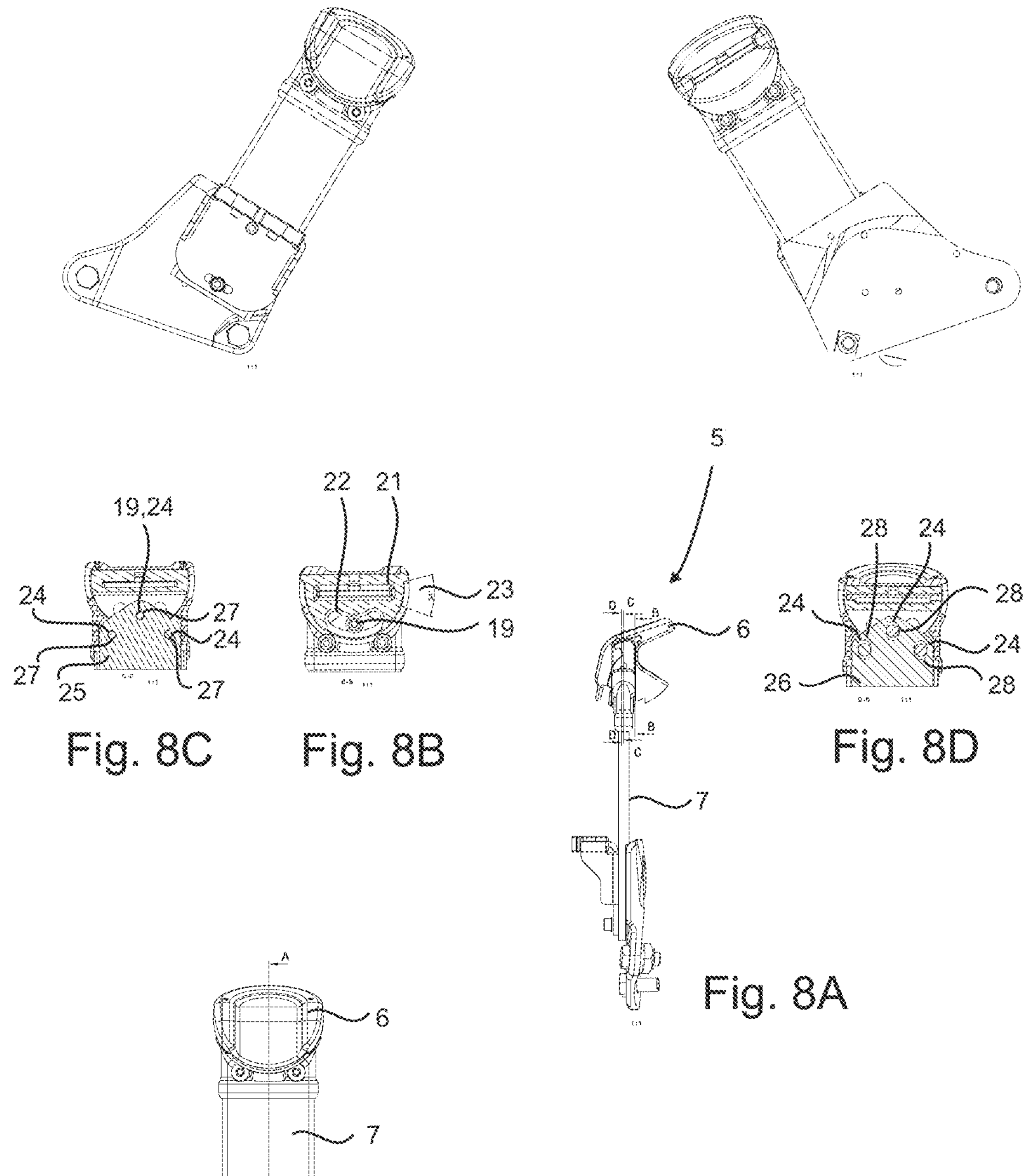
FIG. 8A a side view of the deflection unit.
FIG. 8B a sectional view along B-B.
FIG. 8C sectional view along C-C.
FIG. 8D sectional view along D-D.
FIG. 9A an illustration of a connecting plate.
FIG. 9B the connecting plate with spacer element fitted.

FIG. 8A again shows the spacer element 7 with the deflection element 6, whereby the vehicle seat 1 or the belt system 2 with the belt element 3 has been omitted. FIG. 8A shows further sections, firstly a section B-B, which is shown in FIG. 8B, section C-C, which is shown in FIG. 8C, and a section D-D, which is shown in FIG. 8D.

FIG. 8B shows the deflection element 6 in more detail. In particular, the deflection element 6 comprises a guide slot 21, which is provided and designed so that the belt element 3 can pass through the guide slot 21 from the rear to the front through the deflection element 6. The first screw connection 19 is also shown again, with the deflection element 6 further having a guide groove 22, which is designed so that the first screw connection 19 is arranged in the guide groove 22. The first screw connection 19 is arranged in a fixed position relative to the spacer element 7, so that when the belt element 3 moves in the deflection element 6, for example the guide slot 21, the deflection element 6 moves due to a movement of the guide groove 22 relative to the first screw connection 19, so that the deflection element 6 can be rotated by an angle 23. The angle 23 is shown schematically in FIG. 8B. The angle 23 is limited by the design or configuration of the guide groove 22, i.e. the length of the guide groove 22.

FIGS. 8C and 8D show a locking element 17 in more detail, which is designed to enable or provide the critical angle 10 of the deformation. The locking element 17 is such that the layers 9 of the layer structure 8 are connected to each other by the locking element 17. The design of the locking element 17 is described in more detail below. As can be seen in FIGS. 8C and 8D, the locking connections 24 are provided, which can also preferably be designed as a screw connection. The first screw connection 19 can also function as a locking connection 24. The locking connections 24 are such that the layers 9 of the layer structure 8 of the spacer element 7 are connected to each other. On one side or the first side 25 of the spacer element 7, the locking connections 24 are precisely fitted into corresponding holes 27. The holes 27 are preferably designed as through openings. On the other or second side 26 of the spacer element 7, as shown in FIG. 8D, the locking connections 24 are each arranged in a slotted hole 28. When the spacer element 7 is deformed, the layer structures shift relative to each other accordingly, so that the locking connections 24 also undergo a corresponding movement, whereby the locking connections 24 can follow this movement well due to the design or the provision of slotted holes 28 on the second side 26. The slotted holes 28 are designed in such a way that the locking connections 24 can follow the movement of the spacer element 7 until the respective end of the slotted hole 28 has been reached. Reaching the end of the slotted hole 28 corresponds particularly preferably to the critical angle 10.

The connection or arrangement of the spacer element 7 on the vehicle seat 1 is shown in more detail in the following figures.

It is particularly preferred that the spacer element 7 can be connected to the vehicle seat 1, for example the backrest RL, by means of a connecting plate 29. By means of the connecting plate 29 provided, further functions can be provided with regard to the rotatability or displaceability of the spacer element 7. This is explained further in the following figures.

In particular, the connecting plate 29 has holes 30 which are provided and designed to be connected to the vehicle seat 1 or the backrest RL by a corresponding element extending through the hole 30.

Furthermore, the connecting plate 29 has first holes 31 and second holes 32. Particularly preferably, the first holes 31 are provided above the second holes 32 as viewed in the height direction H. The first holes 31 are spaced apart from one another in the width direction B. The same applies to the second holes 32.

Particularly preferably, the spacer element 7 is connected to the connecting plate 29 by a first hole 31 and a second hole 32.

Depending on the holes 31, 32 with which the spacer element 7 is connected to the connecting plate 29, different positions of the spacer element 7 can be realised with respect to the connecting plate 29 and correspondingly with respect to the vehicle seat 1 or the backrest RL.

According to the present FIG. 9B, a connecting plate 29 is shown, on which the spacer element 7 is arranged. It is provided that, on the one hand, the spacer element 7 is connected to a first hole 31 and to a second hole 32 or can be connected to the connecting plate 29 via these holes 31, 32. Screw connections 34 are provided in the holes 31, 32, which are such that the spacer element 7 can be connected to the connecting plate 29. The connection with respect to the first hole 31 is such that the spacer element forms an axis of rotation 23 here. Further preferably, a slotted hole 35 of the spacer element 7 is provided, which is designed such that the slotted hole 35 is movable relative to the screw connection 34. However, it is also preferably provided that the screw connection 34 allows the spacer element 7 to lie so firmly against the connecting plate 29 that movement in the slotted hole 35 or of the slotted hole 35 is prevented. Rotation of the spacer element 7 is possible according to the configuration of the slotted hole 35.

In principle, it is conceivable that the spacer element 7 can be connected to the connecting plate 29 in any first hole 31 and in any second hole 32. Depending on which holes 31, 32 are formed for fastening the spacer element 7 to the connecting plate 29, the positioning of the spacer element 7 with respect to the connecting plate 29 also changes accordingly with respect to the vehicle seat 1.

It is also provided that the spacer element 7 is detachably connected to the connecting plate 29, so that during use of the vehicle seat 1, the positioning of the spacer element 7 can be adjusted according to the specifications of a person.

Figure 9C:
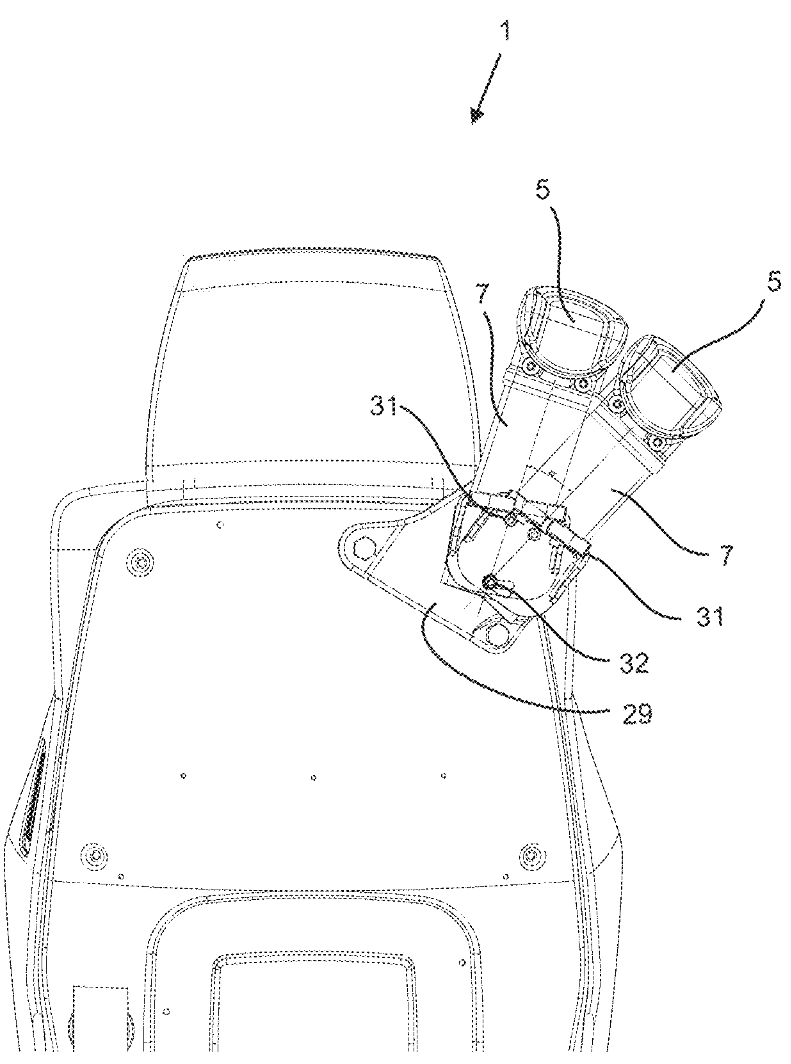
FIG. 9C different rotational positions of the spacer element.

Referring to FIG. 9C, the positioning of the spacer element 7 as just described is shown. Here, it is envisaged that the spacer element 7 is released from a first hole 31 and is rotated relative to the connecting plate 29 and connected to a further first hole 31. The connection to the second hole 32 remains unchanged. As can be seen, the result is a rotation or pivoting of the spacer element 7 about the axis of rotation, which is formed by the second hole 32.

Figure 9D:
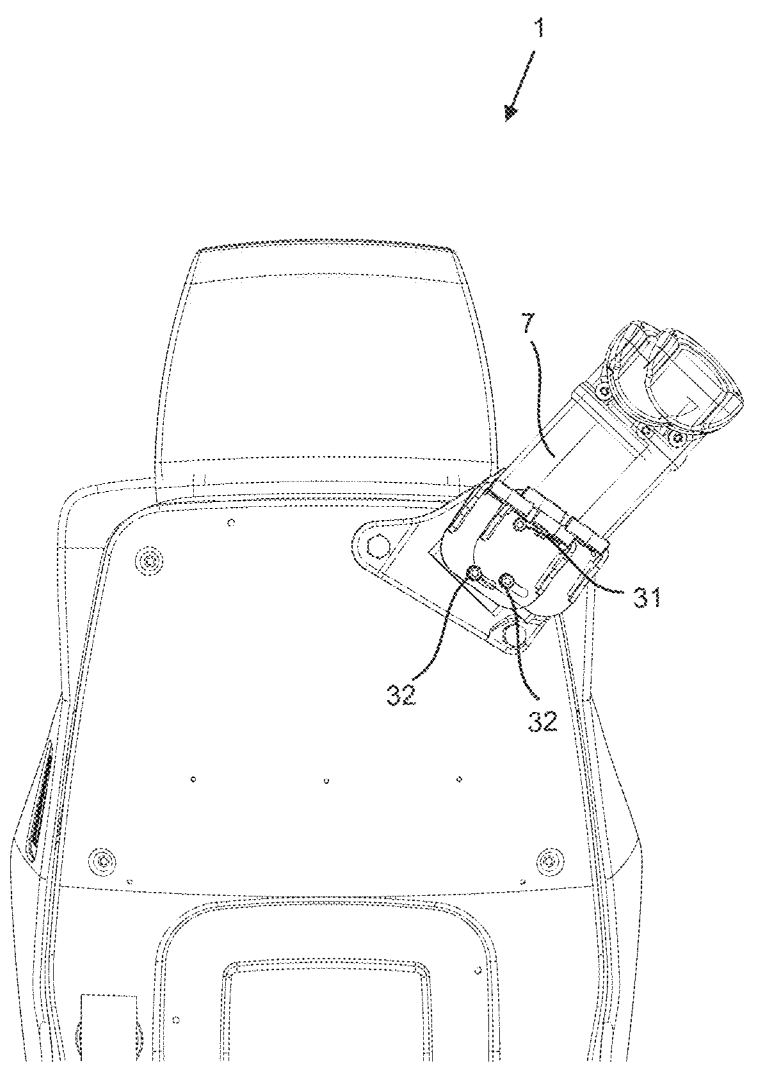
FIG. 9D different displacement positions of the spacer element.

FIG. 9D shows another situation in which the positioning of the spacer element 7 has been changed in such a way that both the position or the connection to a first hole 31 and to a second hole 32 have been changed.

All the features disclosed in the application documents are claimed as being essential to the invention, provided that they are new, either individually or in combination, compared with the prior art. All listed features can be combined with each other in any way.

LIST OF REFERENCE SYMBOLS

1 Vehicle seat
2 Belt system
3 Belt element
4 Reel and unreel mechanism
5 Deflection unit
6 Deflection element
7 Spacer element
8 Layer structure
9 Layer
10 Critical angle
11 First end of the spacer element
12 Second end of the spacer element
13 Rear part
14 Lateral part
15 Upper part
16 Guide element
17 Locking element
18 Spring and/or damping unit
19 First screw connection
20 Slot
21 Guide slot
22 Guide groove
23 Angle
24 Locking connection
25 First side
26 Second side
27 Hole
28 Slotted hole
29 Connecting plate
30 Hole
31 First hole
32 Second hole
33 Axis of rotation
34 Screw connection
35 Slotted hole
RL Backrest
ST Seat part
UT Vehicle seat base
K Headrest

What is claimed is:

1. A vehicle seat with a belt system, the belt system comprising:

a belt element;

a reel and unreel mechanism that is provided and designed to reel and unreel the belt element; and a deflection unit with a deflection element, wherein the deflection element is provided and designed to deflect the belt element in a direction of a person, wherein the deflection unit has a spacer element that is arranged on the vehicle seat, wherein the deflection element is arranged on the spacer element in such a way that the deflection element is spaced from the vehicle seat, wherein the spacer element is elastically deformable, wherein the deflection element is rotatably connected to the elastically deformable spacer element, so that the deflection element can be rotated by an angle, and wherein the angle is limited by the design or configuration of a guide groove.

2. The vehicle seat according to claim 1, wherein the elastically deformable spacer element has a layered design with at least two layers.

3. The vehicle seat according to claim 2, wherein each layer is a leaf spring element.

4. The vehicle seat according to claim 1, wherein the elastically deformable spacer element is designed in such a way that when the spacer element is deformed up to a predetermined critical angle, the deformation of the spacer element is elastic and from the critical angle the deformation of the spacer element is plastic.

5. The vehicle seat according to claim 1, wherein the spacer element is elongate and has a first end and a second end, and wherein the first end is connected to the vehicle seat and the deflection element is arranged at the second end.

6. The vehicle seat according to claim 1, wherein the elastically deformable spacer element is arranged so as to be displaceable and/or rotatable relative to the vehicle seat.

7. The vehicle seat according to claim 1, wherein the elastically deformable spacer element is made of one or more metals and/or metal alloys, and wherein the spacer element is made of a corrosion-resistant spring steel.

8. The vehicle seat according to claim 1, wherein the vehicle seat has a backrest, and wherein the elastically deformable spacer element is connected to the backrest, such that the spacer element is arranged on a rear part of the backrest, on a lateral part of the backrest, and/or on an upper part of the backrest.

9. The vehicle seat according to claim 8, wherein the reel and unreel mechanism is arranged behind the backrest on a seat part of the vehicle seat and/or on a vehicle seat base.

10. The vehicle seat according to claim 1, wherein a guide element is arranged between the reel and unreel mechanism and the deflection element for guiding the belt element.

11. The vehicle seat according to claim 10, wherein the guide element is arranged between the vehicle seat and the elastically deformable spacer element.

12. The vehicle seat according to claim 10, wherein the guide element is arranged on a side of the elastically deformable spacer element facing away from the vehicle seat.

13. A vehicle seat with a belt system, the belt system comprising:

a belt element;

a reel and unreel mechanism configured to reel and unreel the belt element; and a deflection unit having a spacer element and a deflection element rotatable relative to the spacer element, wherein the deflection element is operable to deflect the belt element in a direction of a person occupying the vehicle seat, wherein the spacer element is attached to the vehicle seat, wherein the spacer element is operable to space the deflection unit from the vehicle seat, wherein the spacer element is elastically deformable, wherein the deflection element is rotatable by a predetermined angle, and wherein the predetermined angle is limited by the configuration of a guide groove.

* * * * *